April 26, 1966     G. K. TURNER     3,247,758
DUAL MONOCHROMATOR SYSTEM
Filed June 26, 1961
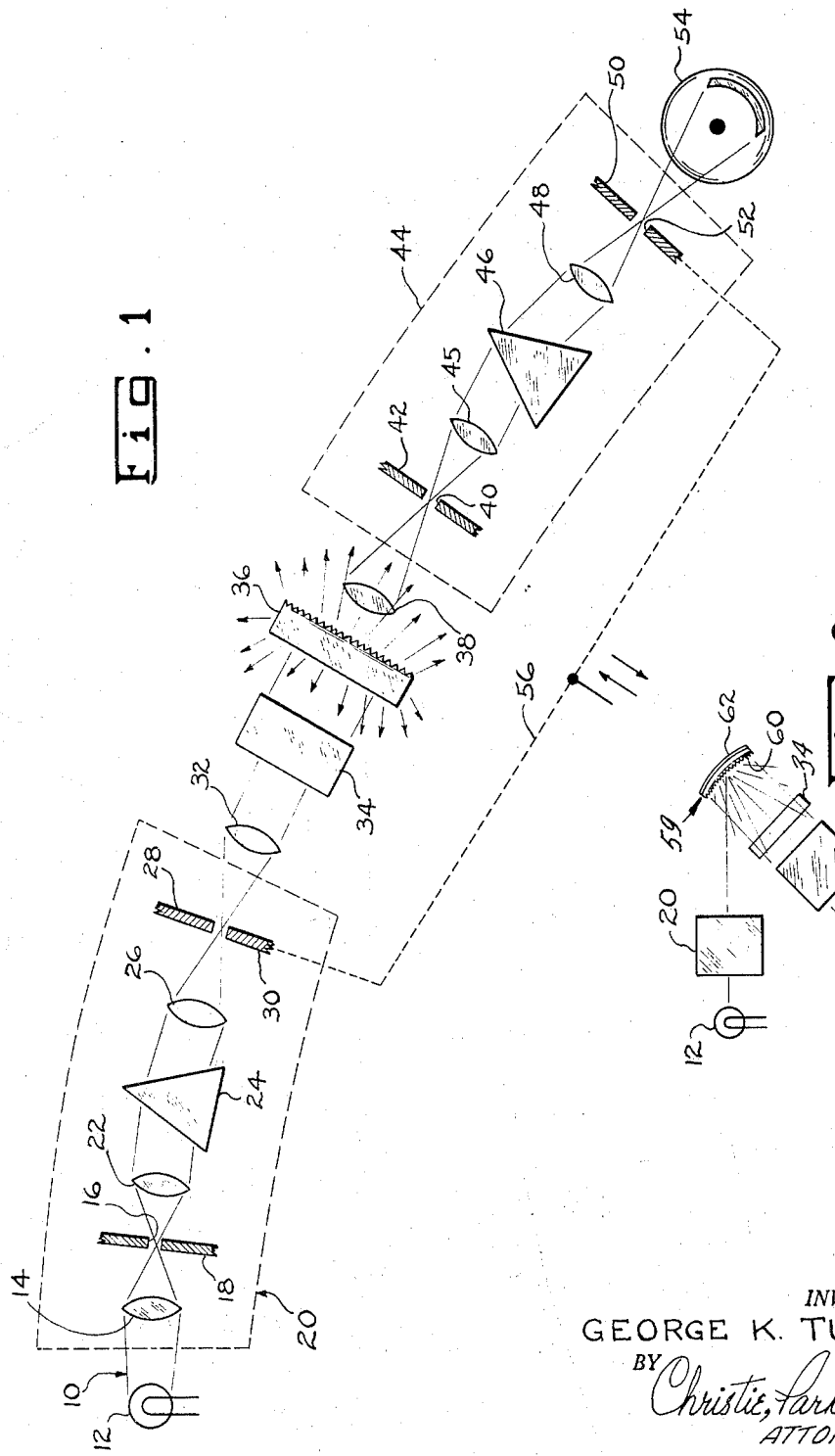
INVENTOR.
GEORGE K. TURNER
BY Christie, Parker & Hale
ATTORNEYS.

United States Patent Office 3,247,758
Patented Apr. 26, 1966

3,247,758
DUAL MONOCHROMATOR SYSTEM
George K. Turner, Palo Alto, Calif., assignor to G. K. Turner Associates, Palo Alto, Calif., a corporation of California
Filed June 26, 1961, Ser. No. 119,361
7 Claims. (Cl. 88—14)

This invention provides an improved optical system to reduce alignment problems such as those found in using a pair of monochromators to detect or record light of a selected wave length.

A monochromator is an instrument for isolating a relatively narrow band of wave lengths of light from a source of polyfrequency light. The light from the source is dispersed into a spectrum of the component wave lengths by a prism or diffraction grating, and the wave length of interest is selected from the spectrum by a properly positioned slit. The position of the slit, prism, or diffraction grating is adjustable to permit the selection of different wave lengths in the spectrum. Proper operation of a monochromator requires careful alignment of the light source and a condensing lens with the center of the slit, which is usually very narrow, say a few thousandths of an inch.

For some work the wave length of light transmitted by the single monochromator is not sufficiently pure, and a second monochromator is used to minimize stray light. The optical elements of the second monochromator must be as carefully aligned as those in the first, but even more critical, the elements in the two monochromators must be optically aligned with each other. This has proved to be so difficult or expensive that dual monochromator instruments are not widely used, even though they are more effective as analytical devices.

This invention substantially reduces the alignment problems in dual monochromator systems so their cost and alignment problems are no longer prohibitive, thereby making them available for more uses.

One field in which this invention finds immediate use is that of spectrophotometery, and although not so limited, the invention is described with particular reference to that application. In spectrophotometery a sample is analyzed by measuring its absorptive power of light of different wave lengths, which are produced by a monochromator as described above. A photoelectric tube is often used as the light sensing device. Unfortunately, photoelectric tubes are responsive to light over a relatively wide band width of frequency, and therefore give erroneous results in response to stray light or fluorescent light emitted by the sample due to absorption of light used for the analysis. The use of a second monochromator to eliminate the effects of stray or fluorescent light from the sample has not been considered practical before this invention because of the strict alignment problems required by a dual monochromator system and because of the variable deviation of the light beam caused by different samples and sample containers disposed between the two monochromators.

This invention reduces or substantially eliminates the alignment problem by the use of a light diffusing element disposed between the two monochromators. The diffuser can be of conventional type, such as that which receives a beam of light at any angle and reemits light uniformly in all directions, or it can be semi-diffusing, i.e., an element which reemits an impinging beam of light as a broader beam of light, but not necessarily uniformly in all directions. The term "diffuser" is used to include either a pure diffusing element or a semi-diffusing element. Thus, light from the first monochromator is diffused over a wide area before it is picked up by the second monochromator, thereby virtually eliminating alignment problems between the two monochromators. The amount of light reemitted by the diffuser is proportional in magnitude to that received, but does not depend critically on the angle at which light is received.

Efficiency of use of light from the source is reduced because some light is lost at the diffuser. In practice, most monochromators have light to spare, or the capacity of the light sources is easily increased. In those cases where increased efficiency of the light is required, a semi-diffuse screen is used. Such a screen reemits a beam of light as a broader beam so that misalignment effects are reduced, but not substantially eliminated as in the case of a total diffuser.

In another form, the diffuser is silvered on one side so that all of the reemitted light leaves from the opposite side of the diffuser to achieve a more efficient use of the light.

These and other aspects of the invention will be more fully understood from the following detailed description and the accompanying drawing in which:

FIG. 1 is a schematic drawing of the presently preferred embodiment of the invention, and FIG. 2 is a schematic drawing of an alternate embodiment of the invention.

Referring to FIG. 1, a beam of polyfrequency light 10 from a light source 12 is focused by a condensing lens 14 through a slit 16 in a light baffle 18 of a first monochromator 20. Light from the slit 16 is made parallel by a collimating lens 22 and directed through a prism 24, which forms a spectrum of the polyfrequency light from the source. The spectrum is focused by a lens 26 on an adjustable light baffle 28, which has a slit 30 positioned to pass a selected wave length or relatively narrow band of wave length of light of interest in the spectrum.

The light of selected wave length is made parallel by a collimating lens 32 and directed through a transparent sample container 34, which holds the sample under investigation. Light passing through the sample and sample container strikes a light diffuser 36, which reemits the light substantially uniformly in all directions. The reemitted light from the diffuser is collected by a condensing lens 38, and focused through the entrance slit 40 of a light baffle 42 in a second monochromator 44. Light from the slit 40 is collimated by a lens 45 and passes through a prism 46 which forms a spectrum of the light picked up from the light diffuser. The spectrum is focused by condensing lens 48 on a light baffle 50 which has an exit slit 52 to permit wave length of a selected frequency to pass from the second monochromator and strike a photoelectric tube 54, which detects the amount of light passing through the second monochromator. The output of the photoelectric tube is connected in conventional fashion to suitable measuring equipment such as an amplifier and recorder (not shown).

The exit light baffles 28 and 50 are adjustable simultaneously through a conventional mechanical linkage 56, so that the light selected by the second monochromator is of the same wave length as that selected by the first. Alternatively, the light baffles can be individually adjustable so that light of separate, respective wave lengths can be selectively passed by each of the monochromators.

The elements shown in FIG. 1 are enclosed in a suitable light-tight case (not shown) of conventional construction, which minimizes the leakage of stray light into the system, or the leakage of stray light from the source through the system.

In using the apparatus shown in FIG. 1, the sample container is filled with the sample under investigation, say hydrocarbon. Light of selected wave length is passed through the sample and its absorption is detected at the photocell. The location of the sample between the two monochromators is of particular advantage because the second monochromator virtually eliminates stray light or any fluorescent light which may be emitted from the sample and be of a wave length different from that under observation. If, for example, blue light is used for the analysis, and the sample can absorb some of the blue light and convert it into red, the red light is prevented from reaching the photoelectric tube by the second monochromator and therefore prevents the fluorescent light from adding to the response of the photoelectric tube.

The light diffuser 36 eliminates the sensitivity of the apparatus to misalignment effects caused by the introduction of the sample container and sample between the two monochromators. In other words, even though light passing from the first monochromator to the second is deviated or refracted due to the optical effects of the sample and sample container, the light diffuser is virtually insensitive to the direction of the light striking it, and it reemits the impinging light substantially uniformly in all directions. Thus, the apparatus is virtually insensitive to misalignment effects which would otherwise be caused by the sample container or sample.

After light of one wave length is used for the analysis of the sample, the positions of the exit slits in the monochromators are shifted to permit the passage of light of a different wave length. This process is repeated until the entire spectrum is investigated or until all the wave lengths of interest have been used.

Thus, the use of the light diffuser eliminates the need for critical angular alignment of two monochromators, regardless of wave length, and reduces cost and alignment problems. The light diffuser also allows the introduction of a practical sample container in the region between the two monochromators, thereby eliminating interference from fluorescence effects. The light diffuser may be of conventional type, such as a piece of quartz etched with hydrofluoric acid, or it may be opal glass when the light under investigation is in visible region.

FIG. 2 shows an alternate light diffuser 59 which has an etched concave side 60, and includes a silver reflective layer 62 on the opposite convex side. The light diffuser shown in FIG. 2 replaces the light diffuser 36 in the system shown in FIG. 1, and is disposed so that light from the sample strikes the etched surface 60. Light which would otherwise leave the opposite surface is reflected by the silver layer and is reemitted from the etched surface so that the light is more or less concentrated, and the concentration effect is increased by the curvature of the element. Scattered light from the diffuser passes through the sample container 34 and then to the second monochromator 44. With this arrangement, the sample and second monochromator is set in a position to receive maximum amount of light from the etched surface of the light diffusing element shown in FIG. 2.

I claim:

1. An optical system for analyzing a sample, the system comprising a polyfrequency source of light, a first monochromator disposed in the path of light from the source to transmit selectively a wave length of light from the source, a sample container disposed in the path of light of the selected wave length of light transmitted by the first monochromator, the sample container being transparent to the said selected wave length, a light diffusing element independent of the sample and disposed in the path of light from the sample container, the light diffusing element being transparent to the light selectively transmitted by the first monochromator and having an etched surface, a second monochromator disposed in the path of light diffused from the diffusing element to transmit said selected wave length of light from the diffused light, and means for detecting the light transmitted by the second monochromator.

2. An optical system comprising a polyfrequency source of light, a first monochromator disposed in the path of light from the source to transmit selectively a wave length of light from the source, a light diffusing element disposed in the path of the selected wave length of light transmitted by the first monochromator, the light diffusing element being transparent to the light selectively transmitted by the first monochromator and having an etched surface, a second monochromator disposed in the path of light diffused from the diffusing element to transmit said selected wave length of light from the diffused light, and means for detecting the light transmitted by the second monochromator.

3. An optical system comprising a polyfrequency source of light, a first monochromator disposed in the path of light from the source to transmit selectively a wave length of light from the source, a light diffusing element disposed in the path of the selected wave length of light transmitted by the first monochromator, the light diffusing element having opposite sides and having a reflective coating on one side to increase the amount of light diffused from the other side, a second monochromator disposed in the path of light diffused from the diffusing element to transmit said selected wave length of light from the diffused light, and means for detecting the light transmitted by the second monochromator.

4. Apparatus according to claim 3 in which the reflective coating is curved concave toward the second monochromator.

5. An optical system for analyzing a sample, the system comprising a polyfrequency source of light, a first monochromator disposed in the path of light from the source to transmit selectively a wave length of light from the source, a light diffusing element independent of the sample and disposed in the path of light from the first monochromator to receive and scatter light of the selected wave length of light transmitted by the first monochromator, the light diffusing element being transparent to the light selectively transmitted by the first monochromator and having an etched surface, a sample container disposed in the path of light scattered from the diffuser, the sample container being transparent to the said selected wave length, a second monochromator disposed in the path of light from the sample container to transmit said selected wave length of light, and means for detecting the light transmitted by the second monochromator.

6. An optical system for analyzing a sample, the system comprising a polyfrequency source of light, a first monochromator disposed in the path of light from the source to transmit selectively a wave length of light from the source, a sample container disposed in the path of light of the selected wave length of light transmitted by the first monochromator, the sample container being transparent to the said selected wave length, a light diffusing element disposed in the path of light from the sample container, the light diffusing element having opposite sides and having a reflective coating on one side to increase the amount of light diffused from the other side, a second monochromator disposed in the path of light diffused from the diffusing element to transmit said selected wave length of light from the diffused light, and means for detecting the light transmitted by the second monochromator.

7. An optical system for analyzing a sample, the system comprising a polyfrequency source of light, a first monochromator disposed in the path of light from the source to transmit selectively a wave length of light from the source, a light diffusing element disposed in the path of light from the first monochromator to receive and scatter light of the selected wave length of light transmitted by the first monochromator, the light diffusing element having opposite sides and having a reflective coating on one side to increase the amount of light diffused from the other side, a sample container disposed in the path of light scattered from the diffuser, the sample container being transparent to the said selected wave length, a second monochromator disposed in the path of light from the sample container to transmit said selected wave length of light, and means for detecting the light transmitted by the second monochromator.

References Cited by the Examiner

UNITED STATES PATENTS 2,670,652   3/1954   Sherman _____ 88—14
2,847,899   8/1958   Walsh _____ 88—14
2,971,429   2/1961   Howerton _____ 88—14

OTHER REFERENCES

Toporets: "Study of Diffuse Reflection From Powders Under Diffuse Illumination," Optics and Spectroscopy, vol. 7, No. 6, December 1959, pages 471–473.

JEWELL H. PEDERSEN, *Primary Examiner.*

EMIL G. ANDERSON, *Examiner.*